(12) United States Patent
De Luna et al.

(10) Patent No.: US 12,399,646 B2
(45) Date of Patent: Aug. 26, 2025

(54) CONFIGURABLE BUFFERED I/O FOR MEMORY SYSTEMS

(71) Applicant: Micron Technology, Inc., Boise, ID (US)

(72) Inventors: Jose Rey C. De Luna, Boise, ID (US); Suresh Rajgopal, San Diego, CA (US); Jeremy Wayne Butterfield, Meridian, ID (US); Dustin J. Carter, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 72 days.

(21) Appl. No.: 17/735,583

(22) Filed: May 3, 2022

(65) Prior Publication Data

US 2023/0359390 A1 Nov. 9, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0629* (2013.01); *G06F 3/0659* (2013.01); *G06F 3/0679* (2013.01)

(58) Field of Classification Search
CPC .... G06F 3/0656; G06F 3/0604; G06F 3/0629; G06F 3/0659; G06F 3/0679
USPC ...................................................... 711/154
See application file for complete search history.

(56) References Cited

U.S. PATENT DOCUMENTS

| | | | | |
|---|---|---|---|---|
| 2006/0277379 A1* | 12/2006 | Funfrock | ............. | G11C 7/1045 |
| | | | | 711/163 |
| 2010/0106997 A1* | 4/2010 | Manning | ............. | G11C 29/028 |
| | | | | 713/503 |
| 2012/0226854 A1* | 9/2012 | Williams | ............. | G06F 3/0665 |
| | | | | 711/E12.001 |
| 2013/0205051 A1* | 8/2013 | Wang | ...................... | H04L 49/90 |
| | | | | 710/56 |
| 2014/0082346 A1* | 3/2014 | Tao | ........................ | G06F 9/4401 |
| | | | | 713/2 |
| 2014/0173378 A1* | 6/2014 | O'Connor | ............. | H03M 13/11 |
| | | | | 714/758 |
| 2014/0192583 A1* | 7/2014 | Rajan | ........................ | G11C 7/10 |
| | | | | 365/63 |
| 2016/0357889 A1* | 12/2016 | Garg | ........................ | G06F 30/20 |
| 2018/0224144 A1* | 8/2018 | Noboa | ...................... | F24F 3/044 |
| 2019/0163228 A1* | 5/2019 | Gupta | ....................... | G06F 1/12 |

* cited by examiner

*Primary Examiner* — Arpan P. Savla
*Assistant Examiner* — Sidney Li
(74) *Attorney, Agent, or Firm* — Schwegman Lundberg & Woessner, P.A.

(57) ABSTRACT

Aspects of the present disclosure configure a system component, such as a memory sub-system controller, to provide a configurable buffer device. The configuration buffer device is coupled between a processing device and a set of memory components. The configurable buffer device can be configured based on configuration data to couple a first quantity of front-side channels to a second quantity of back-side channels. The configuration data can be received from an external source, such as the processing device, or can be stored in a configuration register at manufacture. The configuration data can also be generated or determined based on one or more pins of the buffer device that control how many font-side channels and how many back-side channels to enable/disable.

20 Claims, 5 Drawing Sheets

CONFIGURABLE BUFFERED I/O FOR MEMORY SYSTEMS

TECHNICAL FIELD

Embodiments of the disclosure relate generally to memory sub-systems and, more specifically, to providing a buffer device between a memory controller and memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
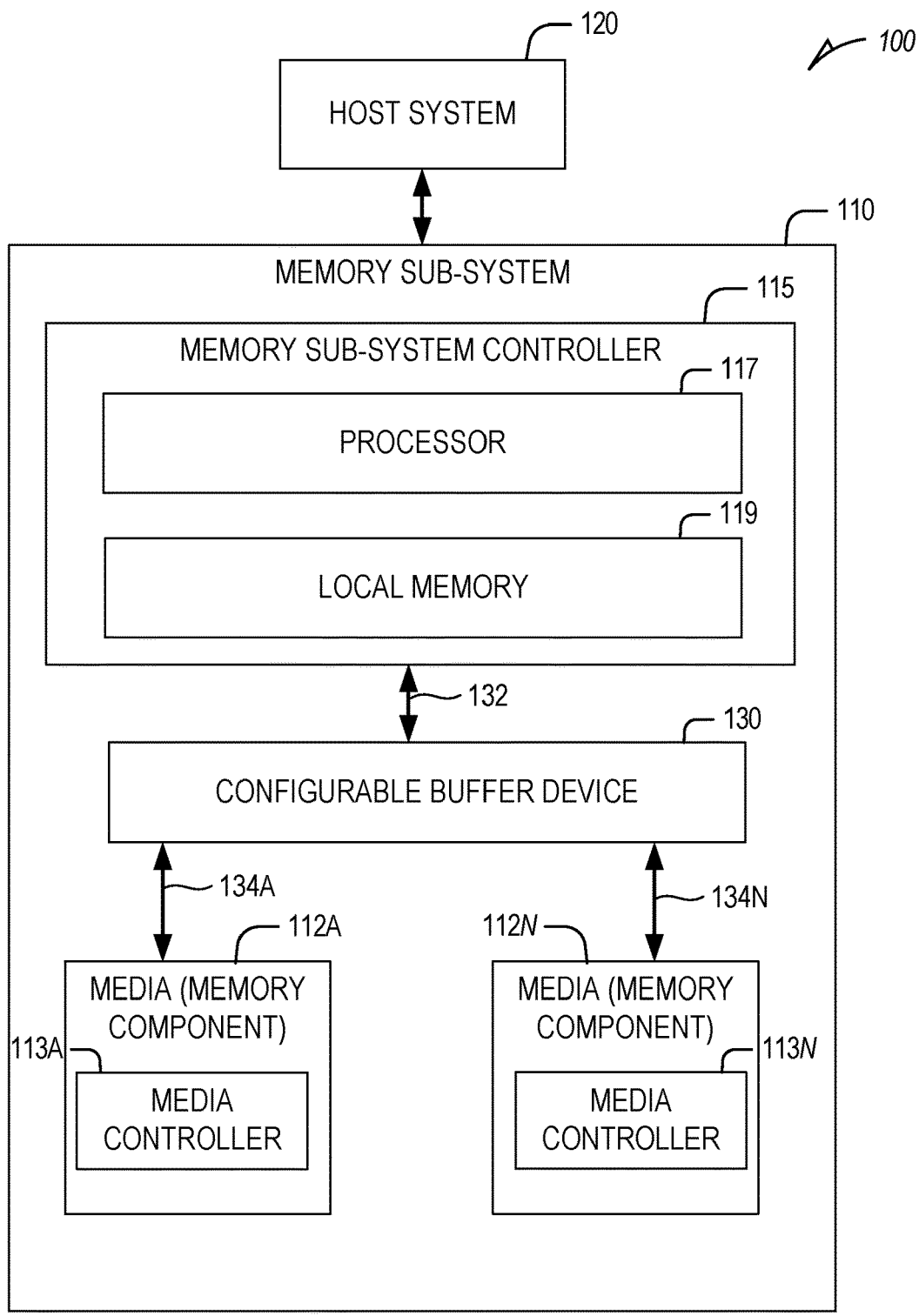
FIG. 1 is a block diagram illustrating an example computing environment including a memory sub-system, in accordance with some embodiments of the present disclosure.

Aspects of the present disclosure configure a system component, such as a configurable buffer device, to reduce the capacitive load impact of memory components in a memory sub-system on a memory controller. The configurable buffer device can be placed or positioned between a controller or host interface and memory components, such as memory dies in a memory package. The configurable buffer device can implement a plurality of front-side channels (coupled to exchange data with a controller) and a plurality of back-side channels (coupled to exchange data with one or more memory components that store data). Based on configuration data (which can be stored on the configurable buffer device and/or received from a controller), the number of front-side channels that are enabled from the plurality of front-side channels and coupled to the number of back-side channels that are enabled from the plurality of back-side channels can be controlled. This enables the configurable buffer device (e.g., buffer chip) to dynamically and selectively tailor the configuration of front-side channels and back-side channels to the particular memory controller needs and application needs, which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". The set of data can be stored in the memory sub-system via a configurable buffer device.

The memory sub-system can initiate media management operations, such as a write operation, on host data that is stored on a memory device. For example, firmware of the memory sub-system may re-write previously written host data from a location on a memory device to a new location as part of garbage collection management operations. The data of the portion of the namespace that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

In some examples, the configurable buffer device can be implemented on the memory device. The configurable buffer device can include front-side channels that receive and send data from/to a controller. The configurable buffer device can route the data from the front-side channels to back-side channels in order to provide that data from/to the one or more dice implemented by the memory device that are coupled to the back-side channels. The configurable buffer device can implement one or more buffer transistors to provide an isolation barrier between the controller or processing device and the one or more dice implemented by the memory device. This can help reduce the capacitive load that is seen by the controller or processing device. Reducing the capacitive load can enable the controller to operate the front-side channel at increased speeds, which increases the data throughput and performance of the memory device.

There are challenges in efficiently implementing a buffer device in typical memory devices. Specifically, different storage systems can require different mappings of controller channels to memory dies. For example, one storage application or system can require that a single controller channel (e.g., front-side channel) be connected to N memory dies. In such cases, the buffer chip between the controller and the memory dies needs to map its single front-side channel to the N memory dies on the backside. This topology is common for storage systems that need to lower controller and board costs (by reducing the number of controller channels) and/or have a need to achieve higher storage capacities by maximizing the number of memory chips for each controller channel. In another example, a different storage system could require two front-side controller channels to connect to N memory dies. The buffer chip in such a system would need to map the two front-side channels to the N memory dies, with each front-side channel mapping to N/2 memory dies. Such a topology can be common for storage systems that prioritize performance over cost or capacity and may need to be compatible with other existing memory packages.

Current buffer devices fail to provide a solution that addresses the needs of all memory devices and applications. Namely, typical systems can implement a particular buffer device with a particular arrangement of front-side and back-side channels, but such a buffer device may not be suitable for a wide range of applications. As a result, one application may see a benefit of such a buffer device while another may be adversely impacted. In order to improve the performance of the other application, a new buffer device needs to be manufactured and implemented in a memory device to be used by the other application. Such manufacturing and process can be costly and time consuming, which can have undesirable and negative consequences. Specifically, in one approach, different buffer chip designs can be developed and used for different storage systems; however, such an approach leads to complexities and added costs in developing, manufacturing, and maintaining multiple buffer chip designs.

Aspects of the present disclosure address the above and other deficiencies by providing a configurable buffer device in a memory sub-system between a controller of a memory sub-system and a group of memory dies either in the same package or in different packages. The configurable buffer device can receive configuration data and use that configuration data to selectively enable and activate a certain quantity of front-side channels (suitable for a particular application) and a certain quantity of back-side channels. The buffer device can couple the enabled front-side channels to respective ones of the enabled back-side channels. As a result, different applications or memory systems can tailor the buffer device to their particular needs without having to redesign a new buffer each time. This reduces the time, complexity and cost associated with providing buffer devices in memory systems.

For some embodiments, the memory sub-system (e.g., memory sub-system controller or buffer device) can receive configuration data for configuring front-side and back-side channels of the configurable buffer device. The buffer device can, based on the configuration data, couple a first of a plurality of front-side channels to a first of a plurality of back-side channels. Thereafter, the buffer device can receive a set of data from a processing device (e.g., the memory sub-system controller) over the first of the plurality of front-side channels and provide the set of data from the first of the plurality of front-side channels to the set of memory components via the first of the plurality of back-side channels. Also thereafter, the buffer device can receive a set of data from the media from the first of the plurality of back-side channels and provide the set of data from the first of the plurality of back-side channels to the first of the plurality of front-side channels back to the memory sub-system controller.

In some examples, in order to couple the first front-side channel to the first back-side channel, the buffer device can disable a group of front-side channels and enable the first front-side channel. Similarly, the buffer device can disable a group of back-side channels and enable the first back-side channel. Then, the buffer device can instruct a multiplexer (or routing network) to connect the first front-side channel to the first back-side channel. In some cases, multiple front-side channels are enabled and one or more back-side channels are enabled. In such instances, the buffer device can instruct the multiplexer to connect a first of the multiple enabled front-side channels to the one or more back-side channels and can instruct the multiplexer to connect a second of the multiple enabled front-side channels to the one or more back-side channels. In some cases, multiple back-side channels are enabled and one or more front-side channels are enabled. In such instances, the buffer device can instruct the multiplexer to connect a first of the multiple enabled back-side channels to the one or more front-side channels and can instruct the multiplexer to connect a second of the multiple enabled back-side channels to the one or more front-side channels.

In this way, any suitable combination of connecting front-side channels to back-side channels can be provided by the buffer device. For example, the combinations can include at least one front-side channel connected to multiple back-side channels; two or more front-side channels connected to a single back-side channel; two or more front-side channels connected to respective and separate back-side channels; two or more back-side channels connected to a single front-side channel; or two or more back-side channels connected to respective and separate front-side channels.

In some examples, the configuration data can be received by the buffer device from the firmware controller or memory controller, such as via a dedicated port/pin and/or via one of the front-side channels. In some examples, the configuration data is received by the buffer device in response to determining that a particular pin or set of pins associated with that configuration have been set/enabled. In such cases, the buffer device can search a configuration database to identify and retrieve configuration data corresponding to the pin or set of pins that have been set/enabled. The configuration data is then stored in the configuration registers of the buffer device and used by a controller of the buffer device to selectively enable front-side and back-side channels and couple the enabled channels to each other according to the configuration data.

In some examples, the buffer device (e.g., a controller of the buffer device) can determine whether the configuration data (e.g., received via the first of the plurality of front-side channels or received over a dedicated port or pin) corresponds to a non-default value stored in one or more configuration registers. In such cases, in response to determining that the configuration data corresponds to the non-default value, the buffer device can control coupling of the first of a plurality of front-side channels to the first of a plurality of back-side channels based on one or more settings stored in the one or more configuration registers. Namely, the buffer device can disregard the configuration data that has been received and can operate or configure the channels based on the default values stored in the configuration registers.

In some examples, the buffer device (e.g., a controller of the buffer device) can determine whether the configuration data received via the first of the plurality of front-side channels corresponds to a non-default value stored in one or more configuration registers. In response to determining that the configuration data corresponds to the non-default value, the buffer device can modify one or more settings stored in the one or more configuration registers based on the configuration data. Namely, the buffer device can override the information stored in the configuration registers with the configuration data received by the buffer device.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). The memory sub-system 110 can include a configurable buffer device 130. The configurable buffer device 130 can be placed between the memory sub-system controller 115 and the memory devices. In some examples, the configurable buffer device 130 is implemented on each of the memory components 112A to 112N. In some examples, the configurable buffer device 130 is implemented as part of the memory sub-system controller 115.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations via the configurable buffer device 130. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify a configuration for the configurable buffer device 130 and can be received as configuration data. The configuration data can specify the quantity or how many front-side channels to enable, how many back-side channels to enable, and/or which front-side channels to connect to which back-side channels of the configurable buffer device 130.

The memory sub-system controller 115 can be responsible for other operations such as wear leveling operations, garbage collection operations, error detection and error-correcting code (ECC) operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding namespace of the set of namespace that is associated with the respective applications. In such cases, even though there may be free space elsewhere on the memory components 112A to 112N, a given application can only read/write data to/from the associated namespace, such as by erasing data stored in the namespace and writing new data to the namespace. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N. In some examples, the address circuitry can determine which front-side channel of the many front-side channels 132 of the configurable buffer device 130 to use to transmit data to the configurable buffer device 130.

The address circuitry can also include a command transmitted to the configurable buffer device 130 that specifies which back-side channel of the many back-side channels 134A through 134N of the configurable buffer device 130 to use to transmit data to the memory components 112A to 112N. In some examples, the configurable buffer device 130 can automatically route a data set received over one front-side channel to a particular back-side channel based on an address specified in the data set. For example, the address can specify a first memory die that is connected to the configurable buffer device 130 over a first back-side channel. In such cases, the configurable buffer device 130 transmits the data to the first memory die over the first back-side channel. As another example, the address can specify a second memory die that is connected to the configurable buffer device 130 over a second back-side channel (or the same first back-side channel). In such cases, the configurable buffer device 130 transmits the data to the second memory die over the second back-side channel (or the same first back-side channel).

The configurable buffer device 130 includes or implements a set of buffer transistors that provide an isolation barrier between the memory sub-system controller 115 (or the host system 120) and the memory components 112A to 112N. The configurable buffer device 130 can implement the isolation barrier using any other suitable circuitry or device.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115 via the configurable buffer device 130.

The configurable buffer device 130 can receive configuration data and use that configuration data to selectively enable and activate a certain quantity of front-side channels 132 (suitable for a particular application) and a certain quantity of back-side channels 134A-N. The configurable buffer device 130 can couple the enabled front-side channels 132 to respective ones of the enabled back-side channels 134A-N. As a result, different applications or memory systems can tailor the buffer device to their particular needs without having to redesign a new buffer each time. This reduces the time, complexity and cost associated with providing buffer devices in memory systems.

The configurable buffer device 130 can receive configuration data for configuring front-side and back-side channels. The configurable buffer device 130 can, based on the configuration data, couple a first of a plurality of front-side channels to a first of a plurality of back-side channels. The configurable buffer device 130 can alternatively couple two or more front-side channels to one or more back-side channels. Thereafter, the configurable buffer device 130 can receive a set of data from the memory sub-system controller 115 over the first of the plurality of front-side channels 132 and provide the set of data from the first of the plurality of front-side channels to the set of memory components 112A to 112N via the first of the plurality of back-side channels 134A-N.

The configurable buffer device 130 can include logic or circuitry to couple any one or more of the front-side channels 132 to any one or more of the back-side channels 134A-N. For example, the configurable buffer device 130 can disable a group of front-side channels and enable a first front-side channel. Similarly, the configurable buffer device 130 can disable a group of back-side channels and enable a first back-side channel. Then, the configurable buffer device 130 can instruct a multiplexer (or other suitable routing network) to connect the first front-side channel to the first back-side channel. In some cases, multiple front-side channels are enabled and one or more back-side channels are enabled. In such instances, the configurable buffer device 130 can instruct the multiplexer to connect a first of the multiple enabled front-side channels to the one or more back-side channels and can instruct the multiplexer to connect a second of the multiple enabled front-side channels to the one or more back-side channels. In some cases, multiple back-side channels are enabled and one or more front-side channels are enabled. In such instances, the configurable buffer device 130 can instruct the multiplexer to connect a first of the multiple enabled back-side channels to the one or more front-side channels and can instruct the multiplexer to connect a second of the multiple enabled back-side channels to the one or more front-side channels. In this way, any suitable combination of connecting front-side channels to back-side channels can be provided by the configurable buffer device 130.

In some examples, the configuration data for controlling which of the front-side channels 132 are enabled to be connected to one or more of the back-side channels 134A-N can be received by the configurable buffer device 130 from the firmware controller or memory sub-system controller 115. This can be received by the configurable buffer device 130 via a dedicated port/pin of the configurable buffer device 130 and/or via a dedicated one of the front-side channels 132. In some examples, the configuration data is received by the configurable buffer device 130 in response to determining that a particular pin or set of pins associated with that configuration have been set/enabled. In such cases, the configurable buffer device 130 can search a configuration database stored by the configurable buffer device 130 to identify and retrieve configuration data corresponding to the pin or set of pins that have been set/enabled. The configuration data is then stored in the configuration registers of the configurable buffer device 130 and used by a controller of the configurable buffer device 130 to selectively enable front-side and back-side channels and couple the enabled channels to each other according to the configuration data.

The memory sub-system 110 includes the buffer device 130 that performs or facilitates routing a set of data (e.g., user data or application data) from a memory sub-system controller 115 (received from the host system 120) to the memory components 112A to 112N in accordance with some embodiments described herein. In some embodiments, the controller 115 includes at least a portion of the buffer device 130. For example, the controller 115 can include a processor 117 (processing device) configured to execute instructions stored in local memory 119 for performing the operations described herein.

Depending on the embodiment, the buffer device 130 can comprise logic (e.g., a set of transitory or non-transitory machine instructions, such as firmware) or one or more components that causes the buffer device 130 to perform operations described herein. The buffer device 130 can comprise a tangible or non-tangible unit capable of performing operations described herein. Further details with regards to the operations of the buffer device 130 are described below.

Figure 2:
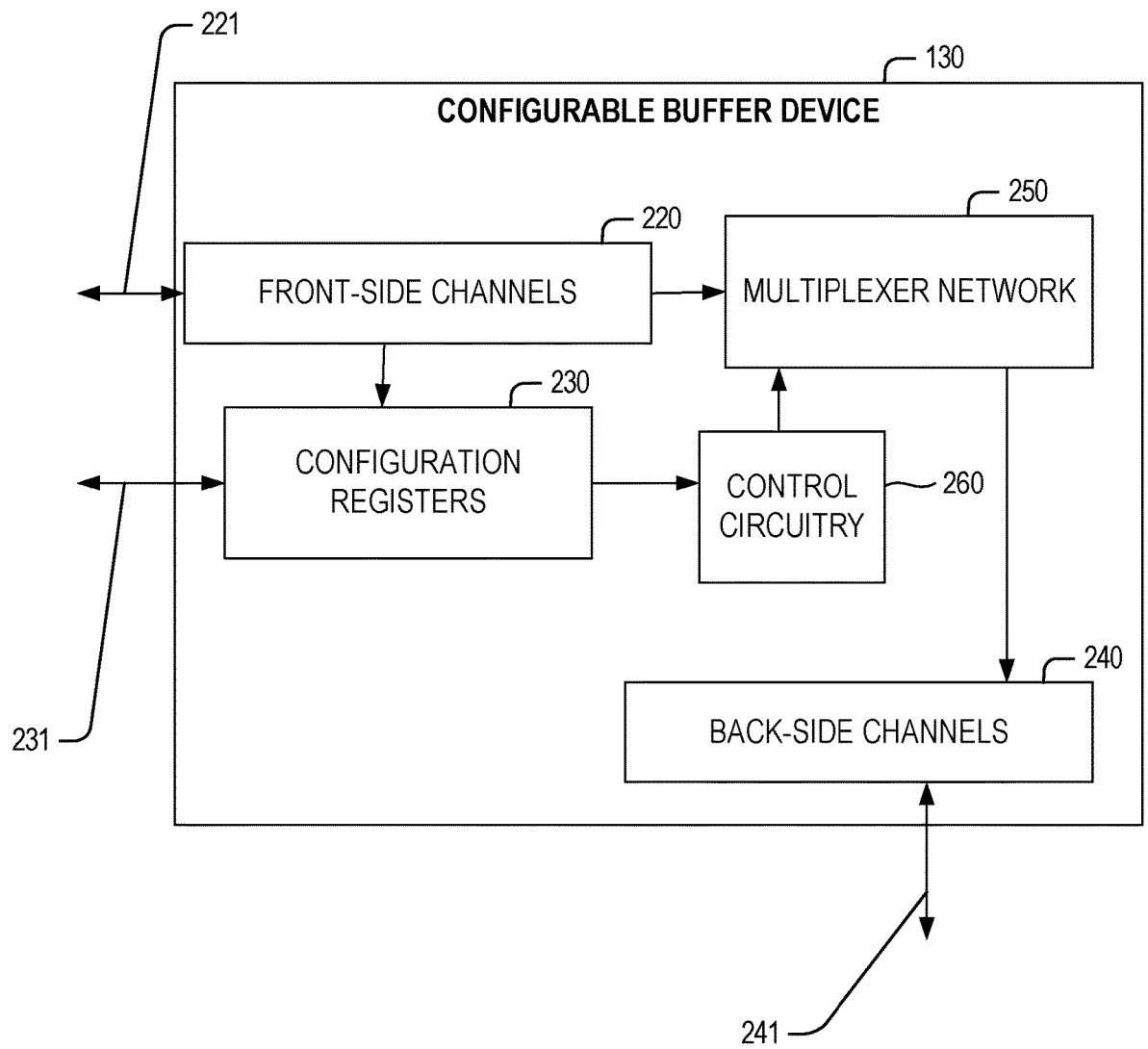
FIG. 2 is a block diagram of an example buffer device, in accordance with some implementations of the present disclosure.

FIG. 2 is a block diagram of an example configurable buffer device 130, in accordance with some implementations of the present disclosure. As illustrated, the buffer device 130 includes a set of front-side channels 220, configuration registers 230, control circuitry 260, a multiplexer network 250, and a set of back-side channels 240. For some embodiments, the buffer device 130 can differ in components or arrangement (e.g., less or more components) from what is illustrated in FIG. 2.

The front-side channels 220 of the configurable buffer device 130 can include any quantity of channels (e.g., wires) that are selectively enabled. The front-side channels 220 can include a first collection of wires that form a first front-side channel. The first collection of wires can include address wires, data wires, control wires, and other suitable wires needed to exchange information with the controller 115. The front-side channels 220 can include a second collection of wires that form a second front-side channel. The second collection of wires can also include address wires, data wires, control wires, and other suitable wires needed to exchange information with the controller 115. The front-side channels 220 are coupled to the controller 115 via a bus 221. The bus 221 forms the front-side channels 132 discussed in connection with FIG. 1.

The back-side channels 240 of the configurable buffer device 130 can include any quantity of channels (e.g., wires) that are selectively enabled to carry data to/from respective memory components 112A to 112N. The back-side channels 240 can include a first collection of wires that form a first back-side channel. This first collection of wires can include address wires, data wires, control wires, and other suitable wires needed to control read/write operations of the memory components 112A to 112N. The back-side channels 240 can include a second collection of wires that form a second back-side channel. The second collection of wires can also include address wires, data wires, control wires, and other suitable wires needed to control read/write operations of the memory components 112A to 112N. The back-side channels 240 are coupled to the memory components 112A to 112N via a bus 241. The bus 241 forms the back-side channels 134A-N discussed in connection with FIG. 1. In some examples, the first collection of wires of the back-side channels 240 can be connected to a first memory die and the second collection of wires of the back-side channels 240 can be connected to a second memory die.

The configurable buffer device 130 includes configuration registers 230. The configuration registers 230 store one or more settings for controlling which of the front-side channels 220 to enable/disable and which of the back-side channels 240 to enable/disable. In some examples, the configurable buffer device 130 receives control or configuration signals from the controller 115 via a bus 231. The bus 231 can be coupled to the configuration registers 230 via a dedicated pin/pins or can be part of the collection of wires of the front-side channels 220. In some examples, the configuration registers 230 can store default configuration settings for setting up the connections between the front-side channels and the back-side channels 240 over the multiplexer network 250.

In some examples, the control circuitry 260 can read the configuration settings from the configuration registers 230. The control circuitry 260 can control or instruct the multiplexer network 250 to couple a particular combination of front-side channels 220 to a particular combination of back-side channels 240. For example, the configuration data received by the control circuitry 260 from the configuration registers 230 can specify or define two front-side channels and four back-side channels. In such cases, the control circuitry 260 can enable the first group of two front-side channels (and keep disabled a remaining set of the front-side channels) and can enable a first group of four back-side channels (and keep disabled a remaining set of the back-side channels). The control circuitry 260 can instruct or control the multiplexer network 250 to couple a first front-side channel of the first group of front-side channels to two (first and second) back-side channels of the four back-side channels. The control circuitry 260 can instruct or control the multiplexer network 250 to couple a second front-side channel of the first group of front-side channels to the other two (third and fourth) back-side channels of the four back-side channels. Each of the enabled back-side channels can be coupled to a respective separate set of dies or memory components 112A to 112N via the bus 241.

After the control circuitry 260 completes reading the configuration settings or data from the configuration registers 230, the configurable buffer device 130 can receive a request to read/write data to/from the memory components 112A to 112N from the controller 115. The configurable buffer device 130 can receive the request over any one of the enabled front-side channels 220. The control circuitry 260 of the configurable buffer device 130 can read the address associated with the request and can map the request or transmit the request to the memory components 112A to 112N over the corresponding back-side channel that is enabled. For example, if the address corresponds to a first memory die that is coupled to a second back-side channel, the control circuitry 260 causes the multiplexer network 250 to route the request to the memory components 112A to 112N over the second back-side channel.

Figure 3:
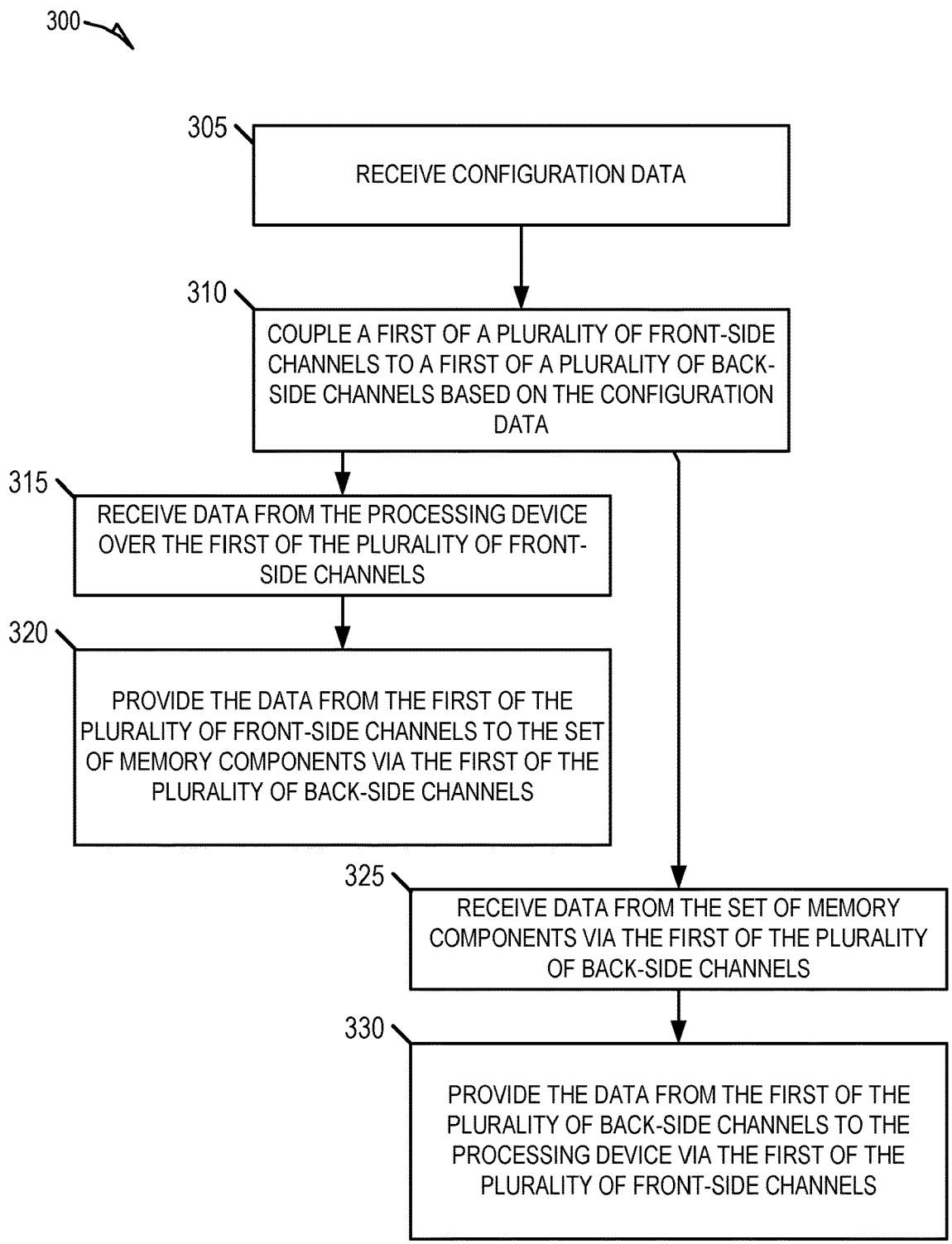
FIG. 3 is a flow diagram of an example method to selectively configure a buffer device, in accordance with some implementations of the present disclosure.

FIG. 3 is a flow diagram of an example method 300 to selectively configure a buffer device, in accordance with some implementations of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the buffer device 130 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a buffer device of a memory sub-system receiving configuration data, such as from a local storage register and/or from a processing device, such as the memory sub-system controller 115 (FIG. 1). For some embodiments, the configuration data is received from a host system (e.g., the host system 120) communicatively coupled to the memory sub-system.

At operation 310, the buffer device of the memory sub-system couples a first of a plurality of front-side channels to a first of a plurality of back-side channels based on the configuration data. For example, the configuration data can specify an individual quantity of front-side channels (e.g., 2 front-side channels) and a specific quantity of back-side channels (e.g., 4 back-side channels). In such cases, the buffer device enables or activates the individual quantity (e.g., two) front-side channels (and keeps disabled the rest of the plurality of front-side channels). The buffer device also enables or activates the specific quantity (e.g., four) back-side channels (and keeps disabled the rest of the plurality of back-side channels). The buffer device uses a routing device (e.g., a multiplexer) to couple or connect a first of the specific quantity (e.g., one channel) of front-side channels to one or more of the specific quantity of back-side channels (e.g., half of the back-side channels, such as 2 back-side channels) and to couple or connect a second of the specific quantity (e.g., another channel) of front-side channels to another group of the specific quantity of back-side channels (e.g., another half of the back-side channels, such as the remaining 2 back-side channels).

Thereafter, at operation 315, the buffer device receives a set of data from the processing device, such as the memory sub-system controller 115, over the first of the plurality of front-side channels. The set of data can include user data or application data obtained from a host system 120. Then, at operation 320, the buffer device provides the set of data from the first of the plurality of front-side channels to the set of memory components, such as memory components 112A to 112N, via the first of the plurality of back-side channels.

At operation 325, the buffer device receives a collection of data from the set of memory components via the first of the plurality of back-side channels. Then, at operation, 330, the buffer device provides the collection of data from the first of the plurality of back-side channels to the processing device, such as the memory sub-system controller 115, via the first of the plurality of front-side channels.

Figure 4:
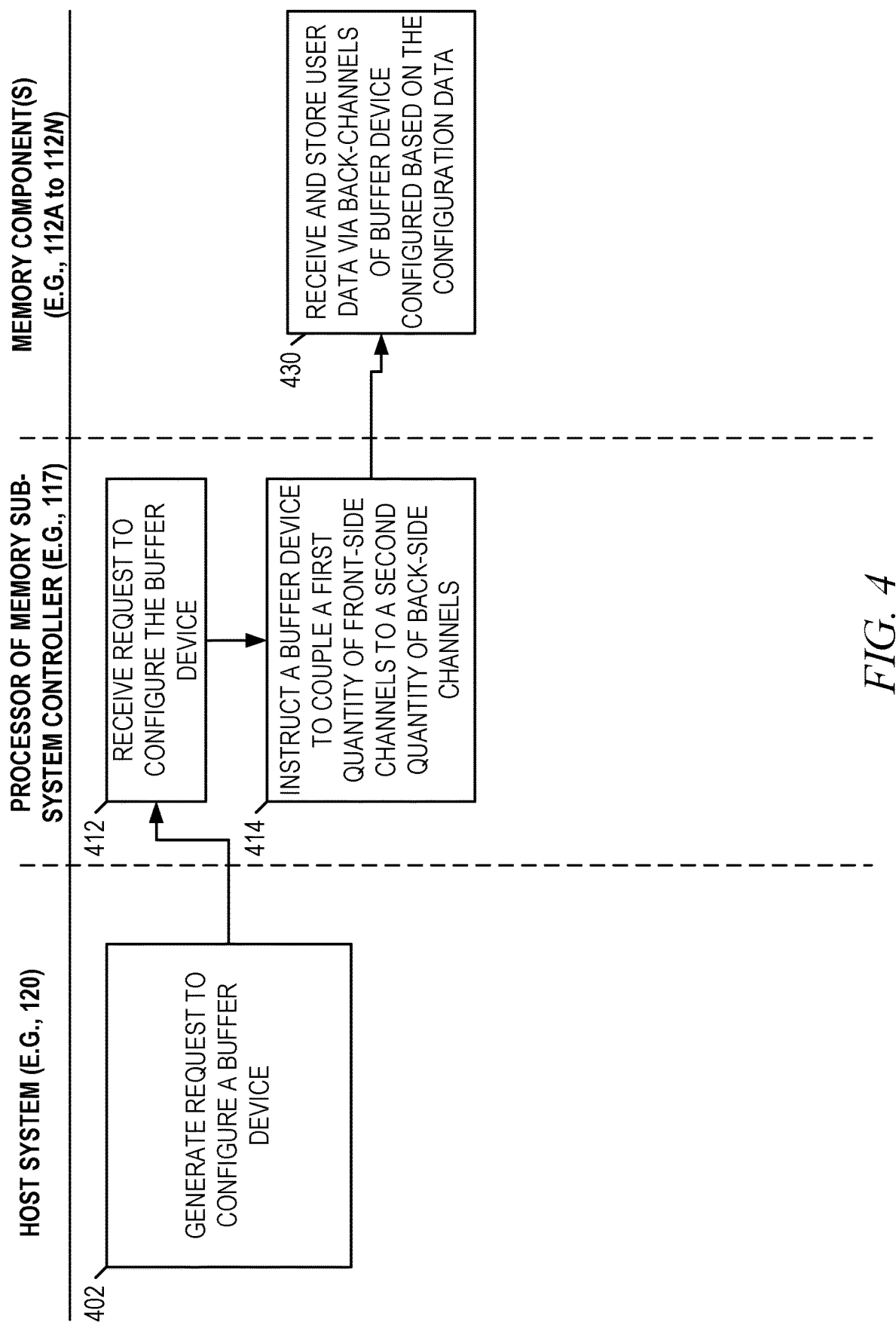
FIG. 4 provides an interaction diagram illustrating interactions between components of the computing environment in the context of some embodiments in which a configurable buffer device is used.

FIG. 4 provides an interaction diagram illustrating interactions between components of the computing environment 100 in the context of some embodiments in which a configurable buffer device is used. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115 and/or by the buffer device 130. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 4, the host system can comprise the host system 120, the processor of the memory sub-system controller can comprise the processor 117 of the memory sub-system 110, and the one or more memory components can comprise at least one of the memory components 112A to 112N.

As shown in FIG. 4, at operation 402, the host system (e.g., via a processor of the host system 120) generates a request to configure a configurable buffer device (e.g., buffer device 130) and, at operation 412, the processor of the memory sub-system controller receives the request to configure the buffer device.

Thereafter, at operation 414, the processor of the memory sub-system controller instructs the buffer device to couple a first quantity of front-side channels to a second quantity of back-side channels. This can be performed by sending configuration data to the buffer device 130 via a dedicated configuration port and/or via a dedicated front-side channel of the buffer device 130. After the buffer device 130 is configured and couples the first quantity of front-side channels to the second quantity of back-side channels, the memory components (e.g., one or more dies coupled to the back-side channels) at operation 430 receive and store user data on block(s) that is received via the back-side channels of the buffer device 130.

Figure 5:
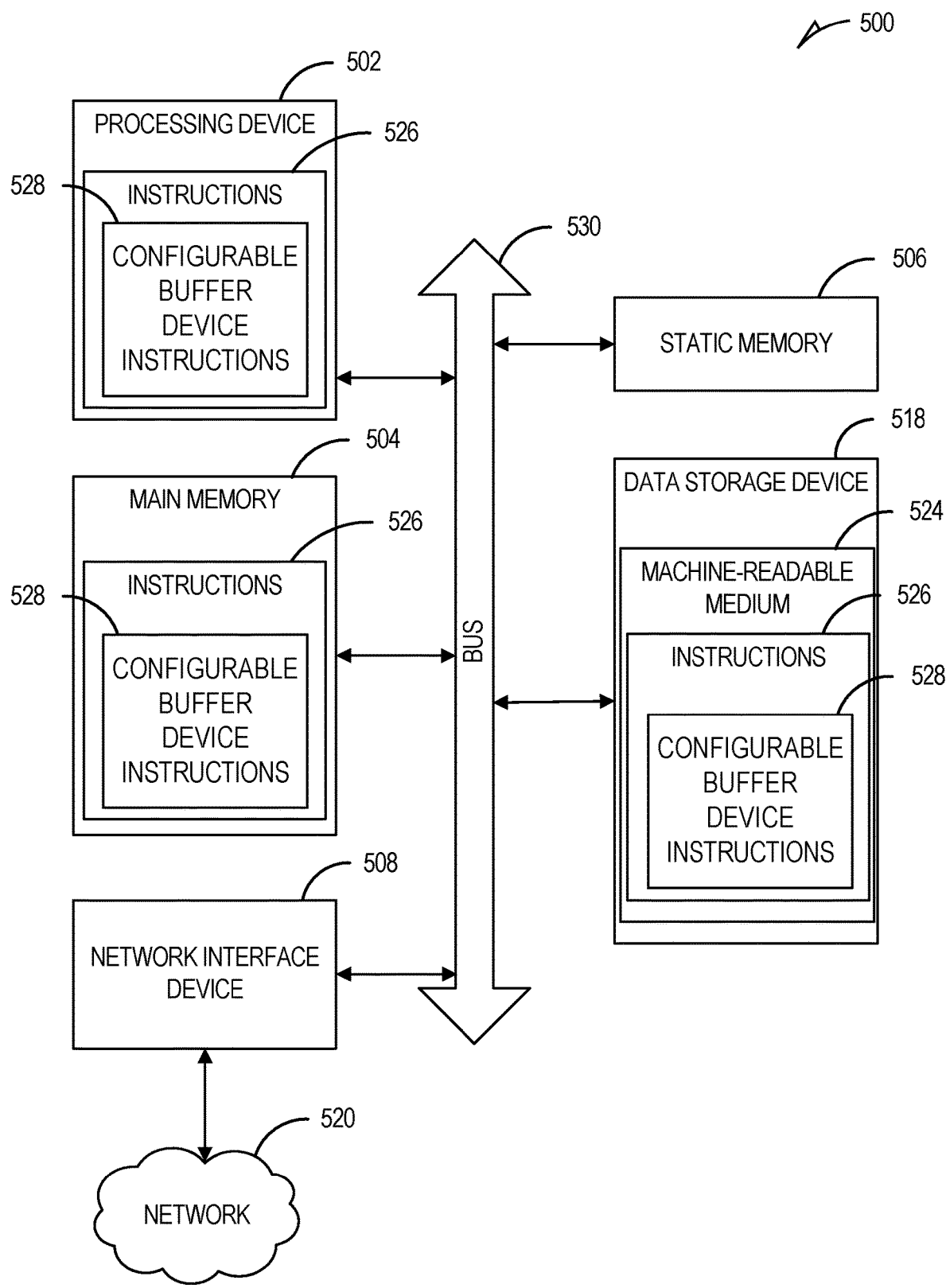
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to configuring a buffer device 130 of FIG. 1 using configurable buffer device instructions 528). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include the configurable buffer device instructions 528 to implement functionality corresponding to a configurable buffer device (e.g., the buffer device 130 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory components of a memory sub-system;
   a processing device of the memory sub-system; and
   a buffer device that has been physically manufactured and is physically coupled between the processing device and the set of memory components, the buffer device including a specified quantity of a plurality of front-side channels and a specified quantity of a plurality of back-side channels, the buffer device reducing a capacitive load seen by the processing device to enable the processing device to operate the plurality of front-side channels at increased speeds to increase a data throughput of the memory sub-system, the buffer device having been physically manufactured to perform operations comprising:
   in response to accessing configuration data, the configuration data specifying which subset of the plurality of front-side channels to connect to which subset of the plurality of back-side channels that are directly connected to the set of memory components:
   selectively enabling a first front-side subset of the specified quantity of the plurality of front-side channels and disabling a second front-side subset of the specified quantity of the plurality of front-side channels;
   selectively enabling a first back-side subset of the specified quantity of the plurality of back-side channels and disabling a second back-side subset of the specified quantity of the plurality of back-side channels, the first back-side subset of the specified quantity of the plurality of back-side channels comprising a first group of back-side channels and a second group of back-side channels, and the second back-side subset of the specified quantity of the plurality of back-side channels comprising a remaining set of back-side channels that are disabled; and
   coupling, via a multiplexer network, a first front-side channel of the first front-side subset of the plurality of front-side channels that have been enabled to the first group of back-side channels of the first back-side subset of the plurality of back-side channels that have been enabled while coupling a second front-side channel of the first front-side subset of the plurality of front-side channels that have been enabled to the second group of back-side channels of the first back-side subset of the plurality of back-side channels that have been enabled without physically replacing the buffer device, such that the first front-side channel is connected to respective and separate back-side channels from the second front-side channel;
   accessing a set of data from the processing device over the first front-side subset of the plurality of front-side channels while maintaining the second front-side subset and the second back-side subset in a disabled state; and
   providing the set of data from the first front-side subset of the plurality of front-side channels to the set of memory components via the first back-side subset of the plurality of back-side channels.

2. The system of claim 1, wherein the first front-side subset of the specified quantity of the plurality of front-side channels includes less than all of the specified quantity of the plurality of front-side channels, and wherein the first back-side subset of the specified quantity of the plurality of back-side channels includes less than all of the specified quantity of the plurality of back-side channels.

3. The system of claim 1, the operations comprising:
   coupling the first front-side subset of the plurality of front-side channels to a second back-side subset of the plurality of back-side channels based on the configuration data, wherein first and second memory components of the set of memory components comprise first and second memory dies are each directly connected without intervening components to the buffer device via a same first back-side channel of the first back-side subset of the plurality of back-side channels.

4. The system of claim 3, wherein the first back-side subset of the plurality of back-side channels is coupled to a first group of the set of memory components, and wherein the second back-side subset of the plurality of back-side channels is coupled to a second group of the set of memory components.

5. The system of claim 1, the operations comprising:
based on the configuration data, coupling a second front-side subset of the plurality of front-side channels to a second back-side subset of the plurality of back-side channels, wherein the first back-side subset of the plurality of back-side channels is coupled to a first group of the set of memory components, and wherein the second back-side subset of the plurality of back-side channels is coupled to a second group of the set of memory components.

6. The system of claim 1, wherein multiplexer network is configured to selectively couple any one of the plurality of front-side channels to any one of the plurality of back-side channels based on the configuration data, wherein the first group of back-side channels includes two back-side channels of four back-side channels, and the second group of back-side channels includes remaining two back-side channels of the four back-side channels, wherein the first front-side channel decoupled from the remaining two of the four back-side channels coupled to the second front-side channel while the second front-side channel is decoupled the two of the four back-side channels coupled to the first front-side channel.

7. The system of claim 1, wherein the buffer device comprises control circuitry, the control circuitry receiving the configuration data from the processing device, the processing device of the memory sub-system providing data, received from a host, to the buffer device via the plurality of front-side channels, the buffer device providing data to the set of memory components via the plurality of back-side channels, the configuration data being received by the buffer device via a same first front-side subset of the plurality of front-side channels through which the data is also received by the buffer device from the processing device.

8. The system of claim 1, wherein the configuration data specifies a first quantity of front-side channels and a second quantity of back-side channels.

9. The system of claim 1, wherein the configuration data is stored in one or more configuration registers of the buffer device, comprising address circuitry configured to specify which back-side channel of the plurality of back-side channels to use to transmit data to the set of memory components.

10. The system of claim 1, wherein the configuration data is received via the first front-side subset of the plurality of front-side channels.

11. The system of claim 1, the operations comprising:
determining whether the configuration data received via the first front-side subset of the plurality of front-side channels corresponds to a non-default value stored in one or more configuration registers; and
in response to determining that the configuration data received via the first front-side subset of the plurality of front-side channels corresponds to the non-default value, disregarding the configuration data that has been received and configuring the plurality of front-side channels and the plurality of back-side channels based on default values stored in the one or more configuration registers.

12. The system of claim 1, the operations comprising:
determining whether the configuration data received via the first front-side subset of the plurality of front-side channels corresponds to a non-default value stored in one or more configuration registers; and
in response to determining that the configuration data received via the first front-side subset of the plurality of front-side channels corresponds to the non-default value, modifying one or more settings stored in the one or more configuration registers.

13. The system of claim 1, the operations comprising:
determining that a pin of the buffer device has been set to a specified value, the specified value selecting a configuration of the plurality of front-side channels and the plurality of back-side channels of the buffer device;
in response to determining that the pin has been set, searching a configuration database to retrieve the configuration data associated with the pin that has been set; and
after retrieving the configuration data from the configuration database based on the pin that has been set, storing the configuration data in configuration registers of the buffer device to control which subset of the plurality of front-side channels to connect to which subset of the plurality of back-side channels.

14. The system of claim 1, wherein the buffer device comprises one or more buffer transistors that provide an isolation barrier between the processing device and the set of memory components.

15. The system of claim 14, wherein the set of memory components comprise one or more memory dies, the processing device being external to the buffer device.

16. The system of claim 1, the operations comprising:
accessing a collection of data from the set of memory components via the first back-side subset of the plurality of back-side channels; and
providing the collection of data from the first back-side subset of the plurality of back-side channels to the processing device over the first front-side subset of the plurality of front-side channels.

17. A method comprising:
accessing, by a buffer device, configuration data, the buffer device being physically manufactured to include a specified quantity of a plurality of front-side channels and a specified quantity of a plurality of back-side channels, the accessing being performed after the buffer device has been physically manufactured, the buffer device reducing a capacitive load seen by a processing device to enable the processing device to operate the plurality of front-side channels at increased speeds to increase a data throughput of a memory sub-system;
in response to accessing the configuration data, the configuration data specifying which subset of the plurality of front-side channels to connect to which subset of the plurality of back-side channels that are directly connected to a set of memory components:
selectively enabling a first front-side subset of the specified quantity of the plurality of front-side channels and disabling a second front-side subset of the specified quantity of the plurality of front-side channels;
selectively enabling a first back-side subset of the specified quantity of the plurality of back-side channels and disabling a second back-side subset of the specified quantity of the plurality of back-side channels, the first back-side subset of the specified quantity of the plurality of back-side channels comprising a first group of back-side channels and a second group of back-side channels, and the second back-side subset of the specified quantity of the plurality of back-side channels comprising a remaining set of back-side channels that are disabled; and coupling, via a multiplexer network, a first front-side channel of the first front-side subset of the plurality of front-side channels that have been enabled to the first group of back-side channels of the first back-side subset of the plurality of back-side channels that have been enabled while coupling a second front-side channel of the first front-side subset of the plurality of front-side channels that have been enabled to the second group of back-side channels of the first back-side subset of the plurality of back-side channels that have been enabled without physically replacing the buffer device, such that the first front-side channel is connected to respective and separate back-side channels from the second front-side channel;

accessing a set of data from the processing device over the first front-side subset of the plurality of front-side channels while maintaining the second front-side subset and the second back-side subset in a disabled state; and providing the set of data from the first front-side subset of the plurality of front-side channels to the set of memory components via the first back-side subset of the plurality of back-side channels.

18. The method of claim 17, the multiplexer network comprising circuitry for routing data from the plurality of front-side channels to the plurality of back-side channels, comprising:

coupling the first front-side subset of the plurality of front-side channels to a second back-side subset of the plurality of back-side channels based on the configuration data.

19. A non-transitory computer-readable storage medium comprising instructions that, when executed by a buffer device, cause the buffer device to perform operations comprising:

accessing configuration data, the buffer device being physically manufactured to include a specified quantity of a plurality of front-side channels and a specified quantity of a plurality of back-side channels, the accessing being performed after the buffer device has been physically manufactured, the buffer device reducing a capacitive load seen by a processing device to enable the processing device to operate the plurality of front-side channels at increased speeds to increase a data throughput of a memory sub-system;

in response to accessing the configuration data, the configuration data specifying which subset of the plurality of front-side channels to connect to which subset of the plurality of back-side channels that are directly connected to a set of memory components:

selectively enabling a first front-side subset of the specified quantity of the plurality of front-side channels and disabling a second front-side subset of the specified quantity of the plurality of front-side channels;

selectively enabling a first back-side subset of the specified quantity of the plurality of back-side channels and disabling a second back-side subset of the specified quantity of the plurality of back-side channels, the first back-side subset of the specified quantity of the plurality of back-side channels comprising a first group of back-side channels and a second group of back-side channels, and the second back-side subset of the specified quantity of the plurality of back-side channels comprising a remaining set of back-side channels that are disabled; and coupling, via a multiplexer network, a first front-side channel of the first front-side subset of the plurality of front-side channels that have been enabled to the first group of back-side channels of the first back-side subset of the plurality of back-side channels that have been enabled while coupling a second front-side channel of the first front-side subset of the plurality of front-side channels that have been enabled to the second group of back-side channels of the first back-side subset of the plurality of back-side channels that have been enabled without physically replacing the buffer device, such that the first front-side channel is connected to respective and separate back-side channels from the second front-side channel;

accessing a set of data from the processing device over the first front-side subset of the plurality of front-side channels while maintaining the second front-side subset and the second back-side subset in a disabled state; and providing the set of data from the first front-side subset of the plurality of front-side channels to the set of memory components via the first back-side subset of the plurality of back-side channels.

20. The non-transitory computer-readable storage medium of claim 19, the operations comprising:

accessing a collection of data from the set of memory components via the first back-side subset of the plurality of back-side channels; and providing the collection of data from the first back-side subset of the plurality of back-side channels to the processing device over the first front-side subset of the plurality of front-side channels.

* * * * *